United States Patent
Dureau et al.

(10) Patent No.: US 6,539,545 B1
(45) Date of Patent: Mar. 25, 2003

(54) INTERACTIVE TELEVISION SYSTEM AND METHOD FOR SIMULTANEOUS TRANSMISSION AND RENDERING OF MULTIPLE ENCODED VIDEO STREAMS

(75) Inventors: Vincent Dureau, Palo Alto, CA (US); Rama Murty Kalluri, San Jose, CA (US)

(73) Assignee: OpenTV Corp., Mountain View, CA (US)

( * ) Notice: Subject to any disclaimer, the term of this patent is extended or adjusted under 35 U.S.C. 154(b) by 0 days.

(21) Appl. No.: 09/494,184

(22) Filed: Jan. 28, 2000

(51) Int. Cl.$^7$ .............................. H04N 7/173; H04N 9/74
(52) U.S. Cl. .................. 725/48; 348/14.07; 348/385.1; 348/588; 725/93
(58) Field of Search ............................. 725/91–93, 100, 725/105, 114–116, 131, 148; 348/565, 566, 568, 588, 14.07, 385.1, 387.1, 584; 325/48

(56) References Cited

U.S. PATENT DOCUMENTS 5,649,032 A  7/1997  Burt et al. ................. 382/284
5,657,096 A * 8/1997  Lukacs ....................... 348/585
5,995,146 A  11/1999  Rasmussen ................ 348/584

* cited by examiner

*Primary Examiner*—Victor R. Kostak
(74) *Attorney, Agent, or Firm*—McDonnell Boehnen Hulbert & Berghoff (57) ABSTRACT

A system and method for the simultaneous transmission and rendition of multiple encoded digital video signal streams in an interactive television application are disclosed. Simultaneous transmission and rendition of multiple encoded digital video signal streams in an interactive television application generally comprises modifying at least one of the multiple encoded video streams broadcast from a broadcast center for repositioning the at least one of the multiple encoded video stream for display, interleaving the modified multiple encoded video streams comprising the at least one modified encoded video stream into a single composite interleaved video stream, and outputting the single composite video stream. The method may further comprise receiving the multiple encoded video streams from a broadcast center. Each of the multiple encoded video streams is preferably encoded using MPEG-1 or MPEG-2 compression technology.

37 Claims, 8 Drawing Sheets

| MBAI VLC | INCREMENT VALUE | MBAI VLC | INCREMENT VALUE |
|---|---|---|---|
| 1 | 1 | 0000 0101 01 | 18 |
| 011 | 2 | 0000 0101 00 | 19 |
| 010 | 3 | 0000 0100 11 | 20 |
| 0011 | 4 | 0000 0100 10 | 21 |
| 0010 | 5 | 0000 0100 011 | 22 |
| 0001 1 | 6 | 0000 0100 010 | 23 |
| 0001 0 | 7 | 0000 0100 001 | 24 |
| 0000 111 | 8 | 0000 0100 000 | 25 |
| 0000 110 | 9 | 0000 0011 111 | 26 |
| 0000 1011 | 10 | 0000 0011 110 | 27 |
| 0000 1010 | 11 | 0000 0011 101 | 28 |
| 0000 1001 | 12 | 0000 0011 100 | 29 |
| 0000 1000 | 13 | 0000 0011 011 | 30 |
| 0000 0111 | 14 | 0000 0011 010 | 31 |
| 0000 0110 | 15 | 0000 0011 001 | 32 |
| 0000 0101 11 | 16 | 0000 0011 000 | 33 |
| 0000 0101 10 | 17 | 0000 0001 000 | MB ESCAPE |

| Number of MBAI_stuffing codes | Number of Bits in the MBAI_stuffing code(s) | Number of Bits Modulo 8 |
|---|---|---|
| 0 | 0 | 0 |
| 1 | 11 | 3 |
| 2 | 22 | 6 |
| 3 | 33 | 1 |
| 4 | 44 | 4 |
| 5 | 55 | 7 |
| 6 | 66 | 2 |
| 7 | 77 | 5 |

INTERACTIVE TELEVISION SYSTEM AND METHOD FOR SIMULTANEOUS TRANSMISSION AND RENDERING OF MULTIPLE ENCODED VIDEO STREAMS

CROSS REFERENCE TO RELATED APPLICATIONS

"This application is related to co-pending U.S. patent application Ser. No. 09/494,067 entitled "INTERACTIVE TELEVISION SYSTEM AND METHOD FOR SIMULTANEOUS TRANSMISSION AND RENDERING OF MULTIPLE MPEG-ENCODED VIDEO STREAMS" filed concurrently herewith, which is incorporated herein by reference in its entirety."

BACKGROUND OF THE INVENTION

1. Field of the Invention

The present invention relates generally to interactive video delivery mediums such as interactive television. More particularly, the present invention relates to a system and method for the simultaneous transmission and rendition of multiple MPEG-encoded digital video signal streams in an interactive television application.

2. Description of Related Art

Interactive television is an interactive audio/video delivery medium which provides broadcast audiovisual content to a number of subscribers. Interactive television provides broadcast video and audio to users and may also provide a return path for the user to interact with the content, e.g., to make selections or order desired products, etc.

In a television broadcast by a television network, such as a broadcast of a bicycle race, the television network may generate multiple video feeds to the network from various angles of the race or from the various bicyclists, for example. The network may select one or more feeds from the multiple video feeds and broadcast the selected video feed(s) to the viewing audience at any given point in time. As is evident, each viewer does not have the option to individually select which video feeds are to be rendered simultaneously for viewing.

A point-to-point network can enable each viewer to select the video feeds to be rendered simultaneously from a set of available video feeds. In the point-to-point network such as in an on-line environment, each viewer may send a request to the head-end server selecting which video feeds the viewer wishes to view. The server may then recompose the screen for each viewer on the head-end and then send to the specific viewer. However, such a point-to-point network or on-line environment requires a significant amount of bandwidth as well as a return path from the viewer site to the head-end server in order for the viewer to send its video selections to the head-end server. Further, such a point-to-point network or on-line environment also requires additional hardware in the head-end server for picture re-composition for each active client.

Another system which can enable each viewer to select the video feeds that the viewer wishes to view from the set of available video feeds is a system having as many decoders in a receiver at the viewer site as individual videos to be rendered simultaneously. For example, if six individual videos are to be rendered simultaneously, the receiver at the viewer site must provide six decoders. However, such a system would require significant processing power in the receiver and increase the cost of the receiver. In addition, the number of videos that can be rendered simultaneously would be limited to the number of decoders provided in the receiver.

Thus, it would be greatly desirable to provide a relatively simple and cost effective system and method for the simultaneous transmission and rendition of multiple encoded digital video signal streams in an interactive television application such that each viewer may select its own set of one or more video feeds from a number of video feeds. Ideally, such a system and method would not require a significant amount of bandwidth or a return path from the viewer site to the head-end server.

MPEG Background

Background on MPEG (Moving Pictures Experts Group) compression is presented here in order to facilitate discussion and understanding of the present invention. MPEG compression is a set of methods for compression and decompression of full motion video images which uses interframe and intraframe compression techniques. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-field data reduction using block-based motion compensation prediction (MCP), which typically uses temporal differential pulse code modulation (DPCM). The MPEG-2 standard is similar to the MPEG-1 standard but includes extensions to cover a wider range of applications. As used herein, the term "MPEG" refers to MPEG-1, MPEG-2, and/or any other suitable MPEG-standard compression and decompression techniques.

An MPEG stream includes three types of pictures or frames, referred to as the Intra (I) frame, the Predicted (P) frame, and the Bi-directional Interpolated (B) frame. The I or Intra frames contain the video data for the entire frame of video and are typically placed every 10 to 15 frames. Intra frames provide entry points into the file for random access, and are generally only moderately compressed. Predicted frames are encoded with reference to a past frame, i.e., a prior Intra frame or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are not used as references for other frames.

An MPEG encoder divides respective frames into a grid of 16 by 16 pixel squares called macroblocks. The respective frames are divided into macroblocks in order to perform motion estimation/compensation. Each picture is comprised of a plurality of slices. The MPEG standard defines a slice as a contiguous sequence of 2 or more macroblocks (16×16 pixel blocks) that begin and end on the same row of macroblocks. A slice begins with a slice start code and includes information indicating the horizontal and vertical location where the slice begins in the picture.

SUMMARY OF THE INVENTION

A system and method for the simultaneous transmission and rendition of multiple encoded digital video signal streams in an interactive television application are disclosed. It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method for simultaneous rendering of multiple encoded video streams at a user site generally comprises modifying at least one of the multiple encoded video streams broadcast from a broadcast center for repositioning at least one of the multiple encoded video stream for display, interleaving the modified multiple encoded video streams comprising the at least one modified encoded video stream into a single composite interleaved video stream, and outputting the single composite video stream. The method may further comprise receiving the multiple encoded video streams from a broadcast center or via cable, satellite, MMDS, or terrestrial networks.

In one preferred embodiment, the method further comprises receiving a list of encoded video streams available for simultaneous rendering and optionally receiving user input from a user at the user site, the user input including the multiple encoded video streams selected from the list of encoded video streams available for simultaneous rendering. The user input may further include a display location for each of the multiple encoded video streams. The modifying may utilize the user input display locations for each of the multiple encoded video streams for repositioning the at least one of the multiple encoded video stream for display. Alternatively, the modifying may utilize a default display location for each of the multiple encoded video streams for repositioning the at least one of the multiple encoded video stream for display. For example, the default display locations for the multiple encoded video streams may be static values stored in the interactive decoder or receiver, determined by layout rules (such as HTML layout engine style) as applied by the interactive decoder, and/or any other suitable methods for determining default display locations. The layout rules may be modified by the producer on the fly at the production center and be transmitted to the receiver for rendering.

The method may further include decoding the single composite interleaved video stream prior to the outputting. The outputting may include outputting to a display for displaying the single composite interleaved video stream as a video display, the video display comprising a display of each of the modified multiple encoded video streams including a repositioned display of each of the at least one modified encoded video stream. Further, each of the multiple encoded video streams is preferably encoded using MPEG-1 or MPEG-2 compression technology.

In another preferred embodiment, the method generally comprises receiving multiple encoded video streams broadcast from a broadcast center for display, selecting at most one of the multiple encoded video streams for each display location, interleaving the selected video streams into a single composite interleaved video stream, and outputting the single composite video stream. In particular, each of the multiple encoded video streams is configured for display in one of a plurality of display locations, where each display location covers a subportion of a display and where the multiple encoded video streams include a plurality of encoded video streams for at least one of the display locations.

A system for simultaneous rendering of multiple encoded video streams generally comprises an interactive decoder adapted to modify at least one of the multiple encoded video streams broadcast from a broadcast center for repositioning the at least one of the multiple encoded video stream for display, interleave the modified multiple encoded video streams comprising the at least one modified encoded video stream into a single composite interleaved video stream, and output the single composite video stream.

The system may further comprise a user interface in communication with the interactive decoder and adapted to receive user input from a user. The user input generally includes the multiple encoded video streams selected from the list of encoded video streams available for simultaneous rendering, wherein the interactive decoder is further adapted to receive the user input from a user via the user interface. In addition, the system may comprise a display for displaying the single composite interleaved video stream as a video display, wherein the video display comprises a video of each of the modified multiple encoded video streams including a repositioned video of each of the at least one modified encoded video stream.

An interactive decoder for simultaneous rendering of multiple encoded video streams, comprising means for modifying at least one of the multiple encoded video streams broadcast from a broadcast center for repositioning the at least one of the multiple encoded video stream for display, means for interleaving the modified multiple encoded video streams comprising the at least one modified encoded video stream into a single composite interleaved video stream, and means for outputting the single composite video stream.

An example of an application for the system and method described herein is a personalized EPG (electronic program guide) mosaic. With the personalized EPG mosaic, a plurality of the end user's favorite shows is displayed, based upon a personalized list, for example. The end user may optionally select a subset from the plurality of the displayed screens or video feeds.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A system and method for the simultaneous transmission and rendition of multiple encoded digital video signal streams in an interactive television application are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Interactive Television System

In a preferred embodiment, the system and method of the present invention are comprised in an interactive television system. However, it is to be understood that the system and method of the present invention may be included in any of various types of video systems, including standard television, interactive television, the Internet, and other types of video or graphics delivery mediums. The term "video" as used herein is intended to include still images, graphics, and live action or motion video.

Figure 1:
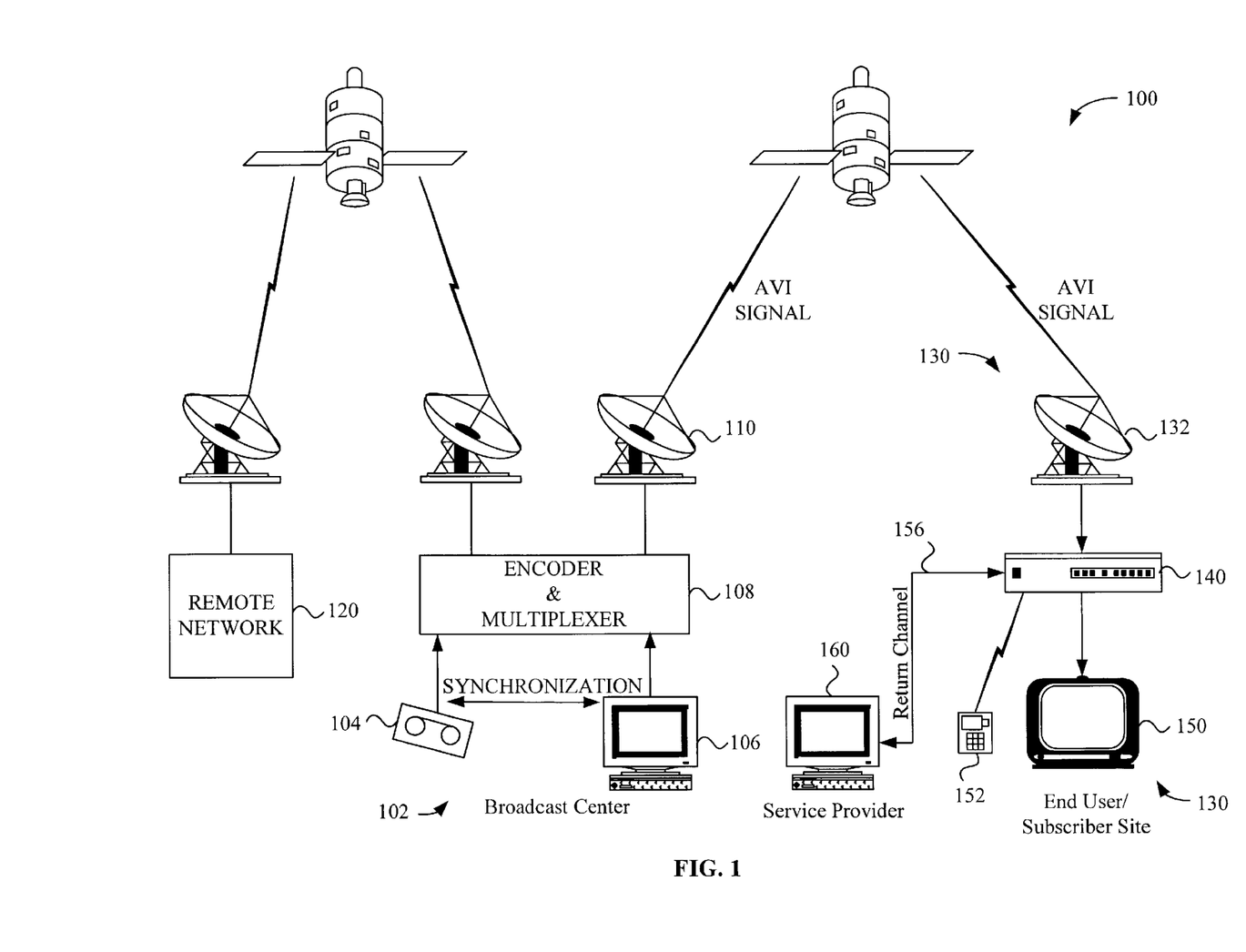
FIG. 1 is a schematic diagram illustrating an interactive television system including a remote network that provides programming content according to one embodiment of the present invention.

FIG. 1 is a schematic diagram of an interactive television system 100 according to one embodiment of the present invention. It is noted that FIG. 1 is illustrative only and other interactive television system embodiments may be utilized as desired.

As shown, the interactive television system 100 employs a broadcast center 102 for generating audiovisual content, including non-interactive audiovisual content and/or interactive audiovisual content. The broadcast center 102 includes an audio/video source 104 for providing the audiovisual content. The audiovisual content may comprise movies, sports, news, sitcoms or other audiovisual programming, as is normally seen on television. The audiovisual content preferably also comprises still images which may be utilized for various purposes. The audiovisual content preferably comprises a plurality of video streams and is preferably configured or designed such that two or more of the video streams can be simultaneously displayed.

The broadcast center 102 provides a plurality of program channels each comprising audiovisual content. One or more program channels may comprise audio-video-interactive (AVI) signals including audiovisual content and associated interactive applications. According to a preferred embodiment of the present invention, the encoder 108 at the broadcast center 102 is operable to encode or compress the videos and to transmit the compressed video streams.

The audio/video source 104 may include video compression logic for compressing still video images into compressed still video images. As shown, the audiovisual content is optionally supplied by a remote network 120 or a live feed as desired.

The broadcast center 102 preferably also includes an application server 106 for creating and/or generating interactive application content. The interactive application content comprises application code and data which is designed to be executed by a processor within a set top box or television to support an interactive television feature. The application server 106 is preferably configured for generating or providing "OpenTV" interactive applications. The application server may also provide "Java" applets or other interactive program content as desired. It is noted that the system and method for simultaneous transmission and rendering of multiple encoded digital video signal streams of the present invention need not be implemented in conjunction with such interactive application content.

An Encoder/Multiplexer 108 combines the interactive application content with the audiovisual content to produce an audio-video-interactive (AVI) signal. The Encoder/Multiplexer 108 also synchronizes the interactive application content with the audiovisual content to ensure that the interactive application content is inserted in the proper position within the audiovisual content. Certain channels may comprise non-interactive programming content. In other words, certain audiovisual content may not have associated interactive content. The Encoder/Multiplexer 108 preferably multiplexes a plurality of signals, including AVI signals and optionally non-interactive signals, together for transmission.

The broadcast center 102 also includes an uplink satellite 110 for transmitting the broadcast signal for receipt by end-users or a subsequent distribution link. Although FIG. 1 illustrates a satellite network example where a satellite is utilized to transmit the broadcast signal, other transmission methods may be utilized, including cable distribution through coaxial cable, fiber optic transmission, microwave transmission and/or any other suitable means.

The broadcast signal is received from broadcast center 102 via a satellite downlink 132, for example. The broadcast signal is then provided to a plurality of end-users or subscribers. As noted above, the broadcast signal may include one or more non-interactive program signals and may include one or more AVI signals on respective channels.

Each end user at a subscriber site 130 preferably includes a set top box receiver or interactive decoder 140 as well as a television set 150. The set top box or interactive decoder 140 is coupled to the television set 150. It is noted that the logic of the interactive decoder 140 may be comprised in the television 150 such that the television set 150 and the interactive decoder 140 comprise a single integrated unit rather than separate units. In addition, the television 150 may comprise a general purpose programmable computer having a display screen or any other suitable viewing device.

In the present disclosure, the term "subscriber television" is intended to include the television set 150 or other viewing device, such as a computer, LCD (liquid crystal display) screen, etc., and may include associated decoder logic for decoding compressed video and/or executing interactive programs. For example, in one embodiment, the subscriber television comprises the television set 150 coupled to the interactive decoder or set top box 140.

A user interface such as a television remote control 152 may be provided at the user site to facilitate user interaction with the television 150 and/or interactive decoder 140. The user can select desired television channels for viewing or select from various interactive selections. According to one embodiment of the present invention, the user can select two or more video streams from among a plurality of simultaneously broadcast videos streams and/or still pictures for display. The user can also optionally select the display locations of each of the multiple video streams on the television set 150. The end user can also selectively configure a graphical user interface (GUI) on the display screen using the present invention.

Although the receiver and the interactive decoder 140 are shown as one unit, the receiver may include any suitable number of interactive decoders and optionally any additional components, such as a recomposition engine, as will be described below. The system and method for the simultaneous transmission and rendition of multiple encoded digital video streams described herein are suitable for the general case where the number of streams rendered is equal to or greater than the number of decoders present in the receiver. In addition, the number of streams rendered is typically less than or equal to the number of video streams sent but can be greater than the number of video streams sent such as where certain streams are displayed more than once.

The signals on the selected television channels are decoded by the interactive decoder 140 which provides an output to the television set 150. The interactive decoder 140 preferably executes a real time operating system, such as OpenTV. Although the description herein is in terms of a system that processes or decodes signals received via broadcast, it is to be understood that the processing may by performed on broadcast signals and/or signals stored in a component resident at the user site, i.e., resident memory, such as in a hard drive (or other memory) of the decoder (or other component).

In the case where the channel being viewed comprises an AVI signal, the interactive decoder 140 may also execute an interactive application program conveyed within the selected AVI signal to enable an interactive television feature.

A return channel 156 optionally interconnects the interactive decoder 140 to a transaction server 160 which monitors certain selections by the user and responds accordingly. The return channel 156 preferably utilizes a standard POTS (plain old telephone system) phone line and associated modems (not shown) for communication. Other return channel options such as coaxial cable, fiber optic cable, DSL (Digital Subscriber Line), ATM (Asynchronous Transfer Mode), or others, may be used, as desired. In the preferred embodiment, the broadcast center 102 broadcasts program such as a bicycle race which includes various video feeds such as a video feed from a camera on each rider's bicycle. Each video feed is independently compressed and independently broadcast to all satellite downlinks 132.

The incoming streams broadcasted by the broadcast center 102 are MPEG streams but need not be fully compliant with the MPEG standard. For purposes of clarity, such non-compliant streams are also referred to as MPEG streams herein. For example, the incoming broadcast streams may be encoded MPEG styles but some of the elements of the streams, such as the sequence headers, may be added by the receiver to the combined output stream.

In addition, a list of available video streams is preferably made available by the interactive application of the broadcast center 102. Each user may select the desired videos from the list of available video streams, thereby allowing each user to monitor the angles of the race that is of interest to the user, such as the points of view of the user's favorite racers.

The interactive decoder 140 receives as inputs the user's selection of which video feeds are to be simultaneously displayed on the user's television set 150 and, optionally, where each of the selected video feed is to be displayed on the user's television set 150. The interactive decoder 140 ignores or discards the non-selected video signals, preprocesses the selected signals in order to reposition the selected video signals for display, and decodes the preprocessed signals. The interactive decoder 140 then presents the user's selected videos as a large composite video which is a mosaic of small pictures on the screen of the user's television set 150.

Such a process of the interactive decoder 140, although interactive in that the user selects the desired videos and their respective display locations, does not require the utilization of the return channel 156 as the processing of the user's selections are completed by the interactive decoder 140 which directly outputs the decoded video signals to the television set 150.

The simultaneous display of multiple video streams may be used in a number of different interactive television applications. For example, the viewer may choose to display a web page or MPEG still from a commercial while simultaneously display other programs. As another example, an interactive commercial can allow the user to select to simultaneously view a plurality of products from a line of products or details of various features of a product.

Interactive Decoder 140

Figure 2:
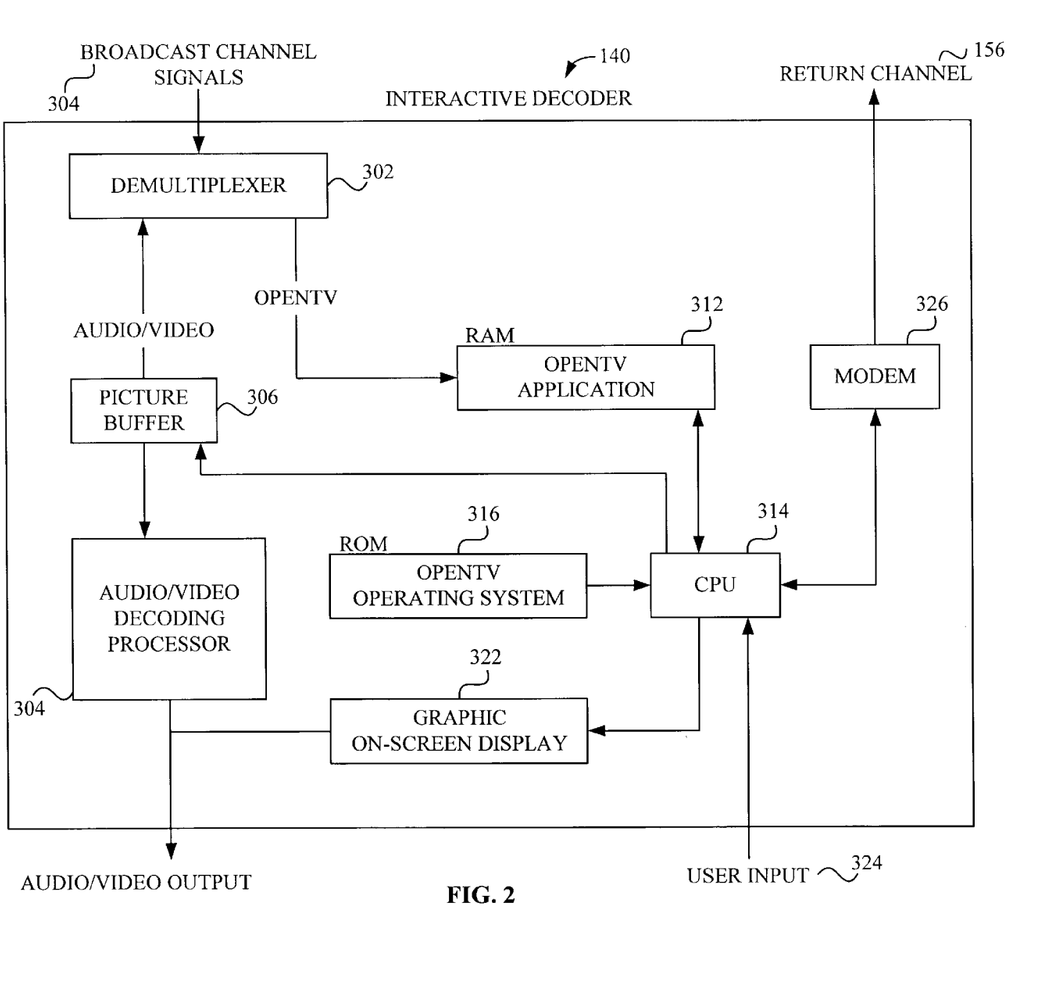
FIG. 2 is a block diagram of the interactive decoder of FIG. 1.

FIG. 2 is a schematic diagram illustrating the set top box or interactive decoder 140. As shown, the interactive decoder 140 includes a demultiplexer 302 for receiving input broadcast channel signals 304 over one or more channels. The input broadcast signals preferably comprises a plurality of channels containing programming content, such as movies, sports, television shows, news, advertising, etc. The broadcast signal preferably includes a plurality of compressed or encoded digital video streams. The audiovisual component is preferably compressed and more preferably MPEG-1 or MPEG-2 compressed. As noted above, only the video (or audio visual) signals corresponding to the video streams selected to be displayed are processed by the interactive decoder 140 while the non-selected video signals are discarded.

The demultiplexer 302 operates to separate the audio/video component from the interactive component of the input broadcast channel signals 304. In a preferred embodiment of the invention, the interactive component comprises an interactive application and/or data which is compliant with the OpenTV standard promulgated by OpenTV Corp. However, other suitable types of interactive applications may be included in the AVI signal.

The demultiplexer 302 provides the audio/video component to an audio/video decoding processor or decoder 304 via a picture buffer 306. The decoding processor 304 operates to preprocess the plurality of selected video streams in order to reposition the video signals for display, interleaves the preprocessed signals, and decodes the interleaved compressed audiovisual signals to produce decompressed data.

In a preferred embodiment, the broadcast channel transports MPEG-2 compressed data. Thus, in the preferred embodiment, the decoding processor 304 preferably includes an MPEG-2 preprocessor, interleave processor, and decoder. The decoder 304 preferably includes one or more digital signal processors ("DSPs") and one or more associated memories. It is noted that the decoder may comprise various types of logic, including one or more DSPs, CPUs, or microcontrollers, discrete logic, or combinations thereof. Details of the decoding processor 304 will be described in more detail.

The decoding processor 304 provides an audio/video output which is preferably provided to the television set 150 for display. When the decoding block 304 receives a plurality of user-selected video streams to be simultaneously displayed, the decoder outputs a single decompressed video stream comprising a mosaic of smaller repositioned pictures to the user's television set 150. The interactive decoder 140 may further include a CPU 314 coupled to a memory 316. The memory 316 is preferably a read only memory (ROM) for storing the interactive application operating system. The operating system is preferably the OpenTV operating system from OpenTV Corp.

Where the input broadcast channel signals 304 include an AVI signal, the demultiplexer 302 provides the interactive program component of the AVI signal to a interactive application memory 312 coupled to the CPU 314. The interactive application memory is preferably a random access memory (RAM) for storing the interactive application, i.e., the OpenTV application. The interactive application from the AVI signal is stored in the RAM 312 and the CPU 314 can read the interactive application from the RAM 312 and execute the application.

Thus, the CPU 314 reads the OpenTV operating system from the ROM 316, whereby the operating system controls the operation of the CPU 314. The CPU 314 also reads the interactive application from the RAM 312, provided with the AVI signal, and executes the interactive application under control of the OpenTV operating system stored in the ROM 316.

As noted above, in a preferred embodiment, a list of video streams available to the user to be displayed simultaneously may be comprised in the interactive application. Thus, the list of available video streams is preferably included as part of the interactive application rather than as part of the audiovisual component. In contrast, the video streams are included as part of the audio/video stream.

Alternatively, the list of video streams available may be transmitted in the signaling of the channel. The signaling of the channel is the list of components that is sent by the broadcaster to the receivers in a uniform manner for all channels. This mechanism is, for example, utilized to allow the receiver to detect secondary audio channels.

The RAM 312 is coupled to the CPU 314. The CPU 314 is in turn coupled to a graphic on-screen display 322. The graphic on-screen display 322 is coupled to provide an output to the television set in conjunction with the audio/video output provided by decoder 304. The graphic on-screen display 322 organizes data in a format which can be overlaid on top of the audio/video output of the decoder 304. Thus, the CPU 314 executes an interactive application and generates on-screen graphics which are provided in conjunction with the audio/video stream output from the decoder 140. For example, if the interactive application is written to cause one or more images or selection options to be displayed or overlaid on top of a television program or still image, the CPU 314 executing the application provides the appropriate output to the graphic on-screen display 322, and the graphic on-screen display 322 causes the respective images or selection buttons to be overlaid on top of and/or displayed with the audio/video output of the decoder 304.

The graphic on-screen display 322 may be 4-bit or 8-bit color memory. The graphic on-screen display 322 may be used for various purposes in addition to a presentation of selection buttons or a list of video streams available for simultaneous display.

The user may provide user input 324 to the CPU 314. The user input may be provided from various devices and is preferably provided via the remote control, buttons on the television set 150, or the interactive decoder 140. The user input 324 provided to the CPU 314 enables a user to interact with the interactive application stored in RAM 312. For example, the user or viewer may select the plurality of video streams to be simultaneously displayed on the television set. Other user inputs 324 may include selection to order a product or order information, provide answers to a television game show, select an insert picture or insert feed from a choice of insert pictures or feeds, wherein the selected insert picture is for display in a background picture, for example. Also, the user or viewer may select locations of each of the plurality of selected video streams to be simultaneously displayed on the television set.

The CPU 314 includes an output coupled to the picture buffer 306. The CPU 314 sends signals to the picture buffer 306 relating to which the video (or audio visual) signals are selected for simultaneous display by the user and the corresponding display location on the television set of each selected video stream. Thus, the picture buffer 306 only receives the video streams selected to be displayed while the non-selected video signals are discarded.

The CPU 314 is preferably further coupled to the return channel 156 via a modem 326 for providing user interactivity. The modem 326 may be used for bi-directional communication. As shown in FIG. 1, the return channel 156 is preferably coupled to a transaction server 160. Thus, if the user selects an option to order information, or purchase a product, the transaction server 160 receives this order and processes the order for fulfillment. Also, if the user answers questions in a game show, the answers are provided on the return channel 156 to the transaction server 160.

Figure 3:
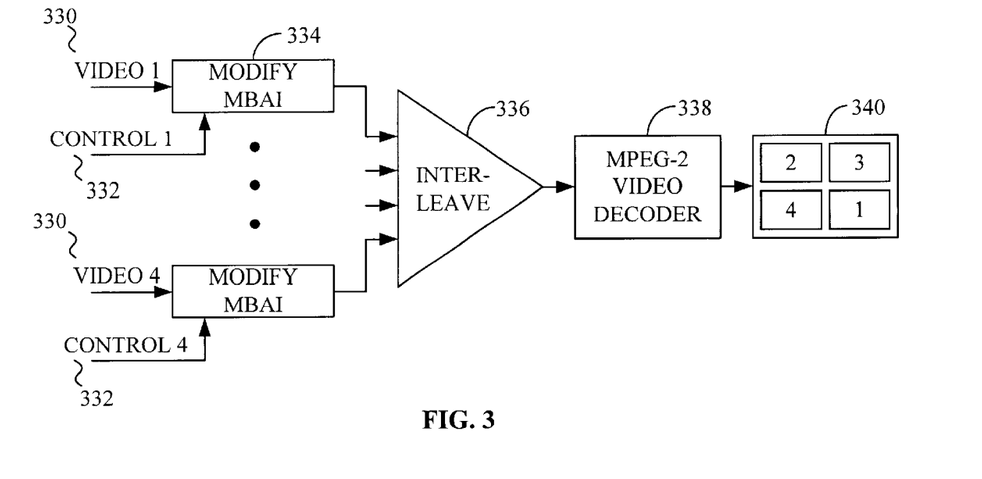
FIG. 3 is a schematic diagram illustrating the operation of the interactive decoder of the present invention.

FIG. 3 is a schematic diagram illustrating the operation of the interactive decoder 140. In the example shown in FIG. 3, four video streams, in particular, video streams 1–4, are simultaneously displayed. In addition, video streams 1–4 are displayed in the lower right, upper left, upper right, and lower left quadrant of the display of the television set, respectively. Preferably, the interactive decoder 140 shown in FIG. 3 is utilized for MPEG-2 compressed video streams.

For each video stream selected to be displayed, the video stream signals 330 and a corresponding control signal 332 containing, for example, the display location information are input to a MBAI (macroblock address increment) modifier 334. The video stream signals 330 represents smaller pictures. The MBAI modifier 334 modifies the MBAI of the video stream signals 330, if necessary, according to the display location of that video stream contained in the corresponding control signal 332. The output of the MBAI modifiers 334, i.e., video streams with modified MBAI, are input into an interleave 336.

The interleave 336 interleaves the smaller modified video streams into a larger single video stream. The single larger video stream is essentially a mosaic of the repositioned smaller pictures. The video decoder 338, preferably a MPEG-2 video decoder, then decodes the single video stream and outputs to the user's television set. The television set then displays the decoded single video stream representing the mosaic of the repositioned smaller pictures according to the user-specified display locations, default display locations, or a combination of user-specified and default display locations. For example, the default display locations for the multiple encoded video streams may be static values stored in the interactive decoder or receiver, determined by layout rules (such as HTML layout engine style) and/or any other suitable methods for determining default display locations. The default location may be computed from the layout rules by a recomposition engine which can reside in the receiver or the head-end, depending upon the configuration utilized.

MPEG-2 Definitions of Certain Terms

For purposes of clarity and to facilitate the discussion set forth below, several terms are presented and defined according to MPEG-2 standard. For example, a pixel refers to a fundamental picture element while a block refers to an 8 by 8 grouping of 64 pixels. A macroblock (MB) is defined as a 2 by 2 grouping of 4 blocks or a 16 by 16 grouping of pixels. A slice refers to a sequence of macroblocks which, for the purposes of the present invention, begins and ends on the same row of MBs. A slice startcode ("SCC") is a byte-aligned unsigned sequence of 4 bytes indicating the start of a slice. The values for the slice startcode range between 0x00000101 and 0x000001AF. The last byte of the slice startcode is the slice startcode value which indicates the row of macroblocks on which the current slice belongs. For example, a value of 01 indicates that the pixels in the slice belong on rows 0 to 15 inclusive and 0xAF indicates that the pixels in the slice belong on rows 2784 to 2799 inclusive.

A macroblock address increment (MBAI) is a variable length codeword (VLC) of length 1 to 11 bits. The MBAI indicates an increment, in units of macroblocks, from the last macroblock of a slice on the same row and indicates the horizontal positioning of the current slice, i.e., the position of the slice from the left edge of the display. For example, an MBAI value of 1 indicates that the current slice belongs on column 0 and extending to at least column 15, inclusive. The MBAI VLC and/or the SCC may be collectively referred to as display position code(s) as they are codes which indicate the display positions of the particular slice.

Flow Chart Illustrating the Process of the Interactive Decoder 140

Figure 4A:
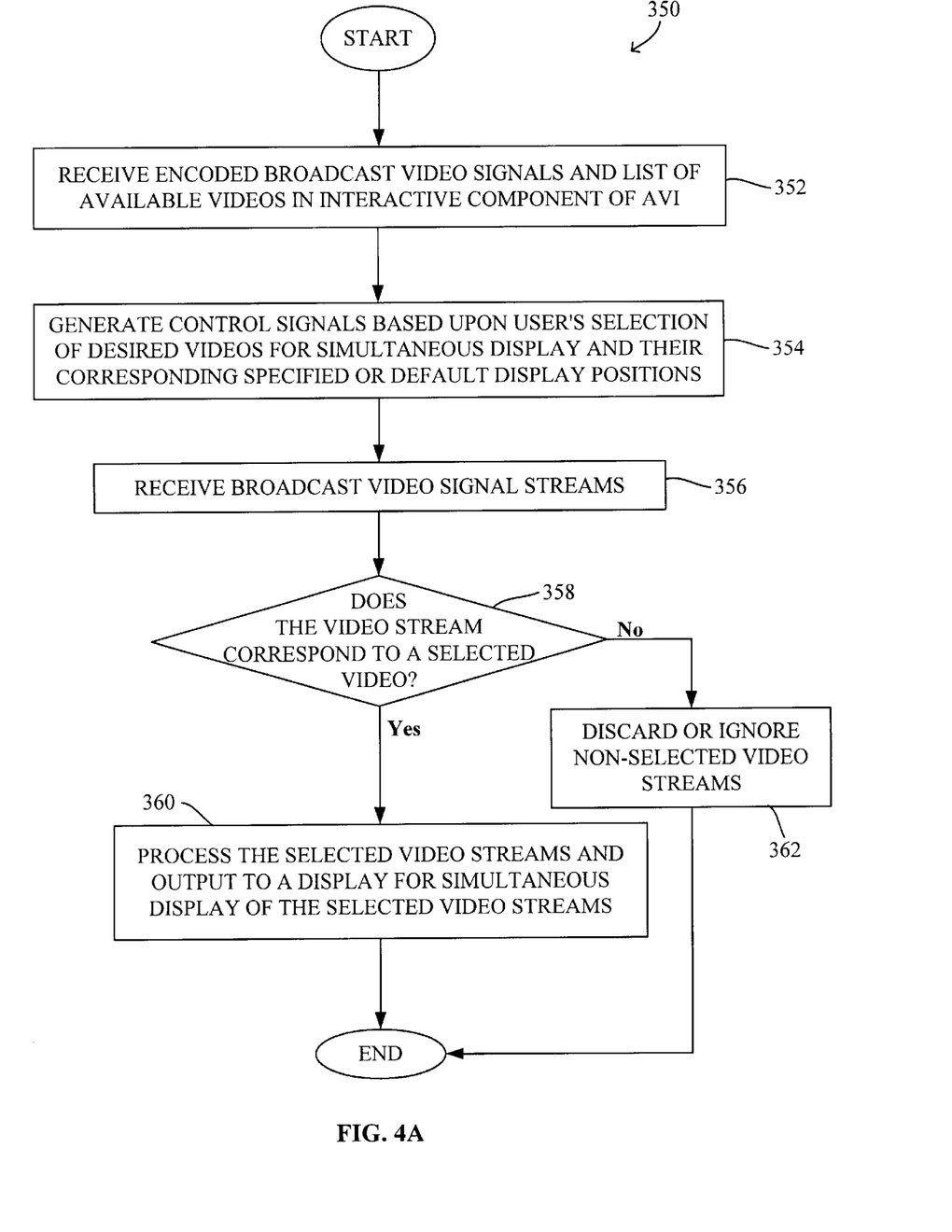
FIGS. 4A and 4B are flow diagram illustrating the process of the interactive decoder of the present invention in processing a plurality of video streams for simultaneous transmission and rendering.
Figure 4B:
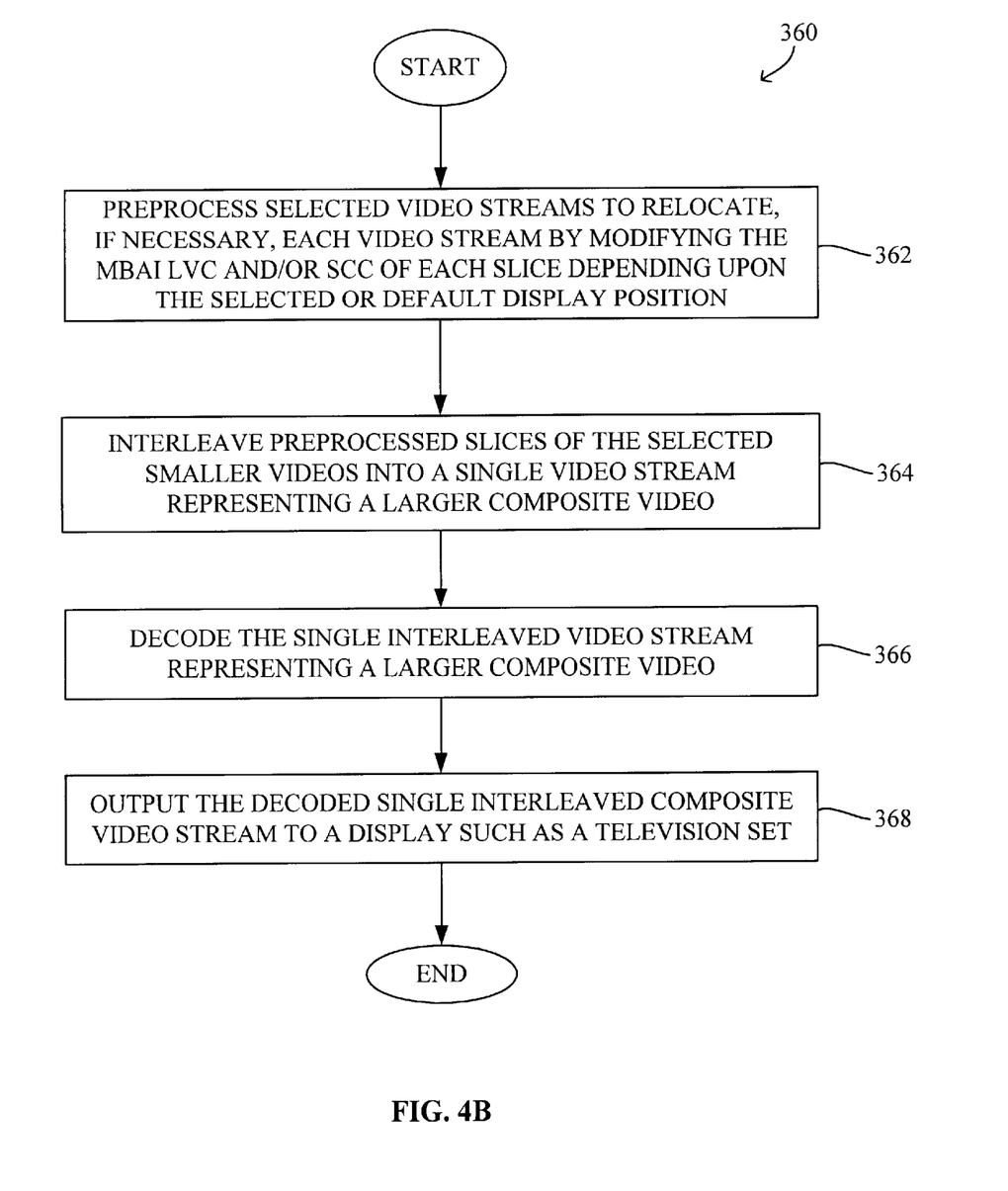

FIGS. 4A and 4B are flow diagram illustrating the process 350 of the interactive decoder of the present invention in processing a plurality of video streams for simultaneous transmission and rendering. As shown in FIG. 4A, the interactive decoder first receives the encoded video signals broadcast by the broadcast center as well as a long of available videos, preferably in the interactive component of the AVI signal in step 352.

At step 354, the interactive decoder generates the control signals based upon the user's selections of the desired videos for simultaneous display and their corresponding specified and/or default display positions. It is to be understood that, although the user may select each of the videos that are to be displayed simultaneously, one or more videos may be displayed by default. In other words, one or more default videos and one or more user-selected videos may be displayed. At step 356, the interactive decoder receives the broadcast video signal streams.

Alternatively, the interactive decoder may receive the list of the available videos in an interactive component of the AVI signal, such as in step 352, generate control signals in step 354, and selectively receive the user-selected broadcasted video streams. The selective reception of the user-selected broadcasted video streams may be achieved based upon an identification or identifier of the packets into which each video stream is divided, such as by the server at the broadcast center. It is noted that the broadcast center divides each MPEG video stream into video packets identified with an identifier and multiplexes the packets in the time domain.

At step 358, the interactive decoder determines whether each of received video streams correspond to one of the selected videos. If so, the interactive decoder processes the selected video streams and outputs the processed output video signals to a display for simultaneous display of the selected videos at step 360. In other words, in step 360, the interactive decoder combines the MPEG encoded video streams prior to decoding. Alternatively, for video streams which do not correspond to the videos selected by the user, the interactive decoder discards or ignores the non-selected video streams.

FIG. 4B illustrates process or step 360 of the interactive decoder in more detail. In particular, at step 362, the interactive decoder preprocesses each slice of the selected video streams to relocate each video stream as necessary depending upon the selected or default display position for that video or video stream. The relocation, if necessary, includes modifying the MBAI LVC and/or the slice startcode or SCC. As noted above, the SCC is a byte-aligned unsigned sequence of 4 bytes indicating the start of a slice, the last byte of which is the slice startcode value which indicates the row of macroblocks on which the current slice belongs. Thus, to reposition or relocate the horizontal or row position of the slice, i.e., the row of macroblocks on which that the slice belongs, the value of the SCC is modified. It is noted that because the SCC is not of a variable length, the value of the SCC may simply be modified without concern regarding bit-alignment within a byte, i.e., byte-alignment.

Next, at step 364, the interactive decoder interleaves the preprocessed slices of the selected smaller videos in an order such that a single video stream representing a larger composite video is generated. The interleaving process can be similar to that described in copending U.S. patent application Ser. No. 08/951,795, entitled "INTERACTIVE TELEVISION SYSTEM AND METHOD FOR INSERTING PICTURES WITHIN PICTURES USING MPEG-1 FRAMES", filed on Oct. 16, 1997, and incorporated in its entirety herein by reference.

Alternatively, although not preferred, the interactive decoder can first interleave the slices of the plurality of the selected video streams and then preprocess, i.e., patch the coordinates of the slices of the interleaved video stream that are to be repositioned. However, because parsing of the interleaved video stream can be difficult, such a process is generally not preferred.

At step 366, the interactive decoder decodes the single interleaved video stream representing the larger composite video. Finally, at step 368, the interactive decoder outputs the decoded single interleaved video stream representing the larger composite video of the videos selected by the user to a display, such as a television set.

Further, the interactive decoder optionally resizes the single interleaved composite video stream in step 368. Preferably, the individual sequences are encoded in a spatial resolution that is smaller than the display such that multiple pictures can be combined and displayed with or without resizing, depending upon the number of pictures that are combined. In particular, the broadcast center preferably broadcasts each video feed in accordance with a predetermined size, e.g., one-quarter of a typical display size, such as the typical high-definition television display size. Thus, if the end user selects four pictures for simultaneous display, resizing by the decoder would be unnecessary.

The specific predetermined size broadcasted by the broadcast center may depend in part on the optimization of the desired resolution of the picture while minimizing processing requirements. In MPEG compression technology, the video feed is divides into macroblocks and each macroblock is compressed into a compressed stream. The interactive decoder decompresses each compressed stream to rebuild the picture. The interactive decoder can then zoom the picture to the desired size. In other words, the interactive decoder generally cannot resize each compressed slice but can resize an overall picture. Thus, the interactive decoder preferably resizes the single interleaved composite video stream in order to display the resulting video in a desired size.

For example, where each video feed from the broadcast center is one-quarter of the typical television display size and the user selects 6 video feeds for simultaneous viewing, the single interleaved composite video stream would be too large for the display. The interactive decoder thus preferably resizes the composite video stream into a desired size, preferably a size which does not distort the videos but maximizes the utilization of the viewing portion of the display.

The receiver preferably also inserts a fill-in sequence to cover portions of the display or screen that are not covered with the combined videos. For example, if the incoming streams each take one-quarter of the output display and three sequences are selected and combined, the receiver may cover the remainder quarter of the display screen with a fill-in video which can either be sent by the broadcast server or generated by the receiver, such as an empty sequence (e.g., a green rectangle) or a still I-frame.

In one embodiment, none of the streams is modified for positioning. Such a case may result where the head-end sends multiple optional streams for each location covering a subportion of the display and where the end user of the receiver, e.g., by default and/or based on user profile, selects an option for each position. In other words, the multiple encoded video streams broadcast would be configured for display in one of the two or more display locations. The multiple encoded video streams would include more than one encoded video stream for at least one of the display locations.

For example, a commercial may include a number of sub-pictures each at fixed display location and the content of each display location would be selected by the end user and/or by the receiver based on user profile. In particular, a commercial for a department store may comprise a left sub-picture that advertises the department store in general and a right sub-picture that advertises a particular product. The left sub-picture may be selected based on the preferred language of the end user while the right sub-picture may be selected based on the profile of the end user household, such as the number and ages of the children in the household. In such a scenario, the left sub-pictures sent by the head-end may be an English and a Spanish advertisement for the department store in general and the right sub-pictures sent by the head-end may be a toy and a cloth advertisement.

It is to be noted that although the process 360 of combining multiple MPEG encoded streams prior to decoding is preferably executed at the user site, the process 360 may be implemented elsewhere, such as at the broadcast center, for example. The configuration for such an implementation is preferably where a primary head-end sends the compressed videos to a secondary head-end and where the secondary head-end recomposes videos and narrow cast the recombined stream to a single receiver or group of receivers. The utilization of the secondary head-end is optional and provides savings in bandwidth. The benefit of such a configuration is that hardware costs in the receivers are minimized or reduced. For example, such a configuration would be beneficial in the case where receivers are already deployed and cannot easily be upgraded with the necessary additional hardware or software. In addition, such a configuration would be beneficial in the case where it is cheaper to centralize the capability in secondary head-ends if the feature is only utilized by and/or available to a limited number of receivers at a given point in time.

Example of Simultaneous Rendition of Multiple Video Streams

Figure 5A:
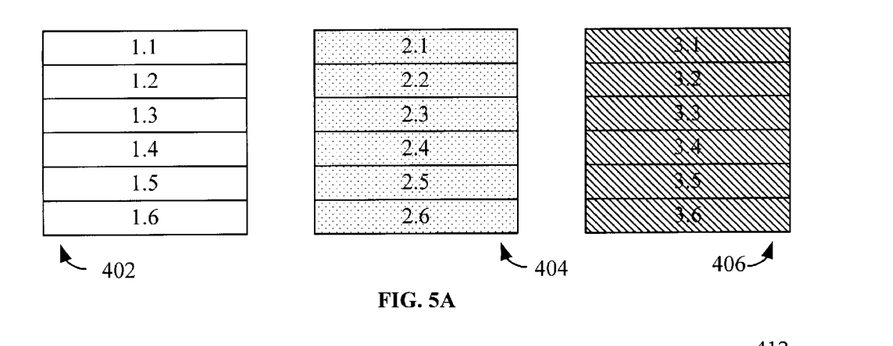
FIGS. 5A–5D illustrate by way of example the operation of the interactive television system of the present invention.

The process of the interactive decoder as shown and described with reference to the flow diagrams of FIGS. 4A and 4B will now be illustrated by way of example. In particular, FIGS. 5A–5D illustrate an example of the operation of the interactive television system of the present invention. FIG. 5A illustrates three separate pictures or videos 402, 404, 408. Each of the separate videos contains a number of slices. For example, video 402 includes slices 1.1, 1.2, 1.3, 1.4, 1.5, and 1.6. Similarly, video 404 includes slices 2.1, 2.2, 2.3, 2.4, 2.5, and 2.6 and video 406 includes slices 3.1, 3.2, 3.3, 3.4, 3.5, and 3.6.

Figure 5B:
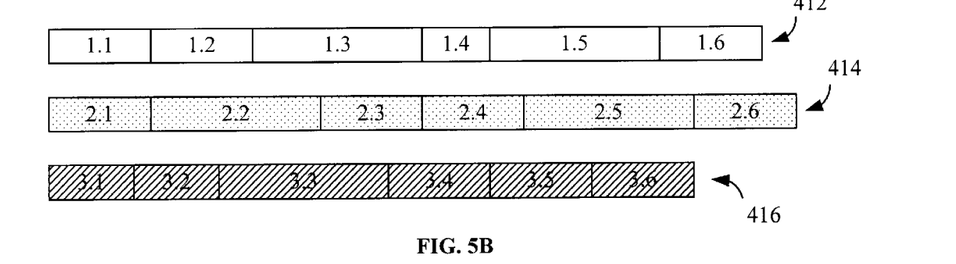

FIG. 5B illustrates the transmission of each of the videos 402, 404, 406 from the broadcast center to the interactive decoder as a video stream. For example, video 402 comprising slices 1.1, 1.2, 1.3, 1.4, 1.5, and 1.6 is transmitted as a video stream 412. As shown, the video stream 412 comprises the slices 1.1, 1.2, 1.3, 1.4, 1.5, and 1.6 in series. Similarly, video 402 is transmitted as video stream 414 comprising the slices 2.1, 2.2, 2.3, 2.4, 2.5, and 2.6 and video 406 is transmitted as video stream 416 comprising the slices 3.1, 3.2, 3.3, 3.4, 3.5, and 3.6 in series.

In addition to the video streams of the videos or pictures available to the user for simultaneous display, the broadcast center preferably also transmits a list of the video streams available to the user to be displayed simultaneously. As noted above, the list of available video streams may be comprised in the interactive component of the AVI signal.

At the user site, the user may select two or more of the videos 402, 404, 406 for simultaneous display. In the example shown in FIGS. 5C and 5D, the user selects to display video 402 on the left hand side and video 404 on the right hand side of the television set display. Alternatively, such a display configuration may be the default display configuration where the user does not specify the display locations of all of the videos. Thus, the interactive decoder preprocesses the video streams 412, 414 corresponding to the videos 402, 404 and discards or ignores the video stream 416 corresponding to the video 406.

Figure 5C:
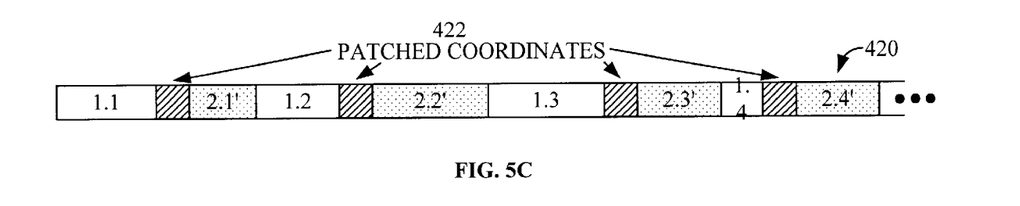
Figure 5D:
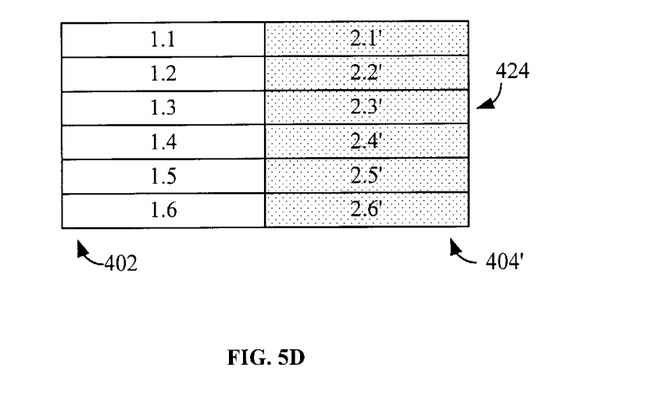

The interactive decoder generates control signals based upon the user's selections and optionally the default display configuration. Based upon the control signals, the interactive decoder preprocesses each slice of the selected video streams to relocate each video stream as necessary depending upon the selected or default display position for that video or video stream. The interactive decoder then interleaves the preprocessed slices of the selected smaller videos, namely videos 402 and 404.

FIG. 5C illustrates a portion of the resulting single interleaved video stream 420 representing a larger composite video as generated by the interactive decoder. Because each slice of the video stream 412 corresponding to video 402 is positioned at the left edge or border of the display, the slices 1.1, 1.2, 1.3, 1.4, 1.5, and 1.6 of the video stream 412 are not modified as they are not repositioned in the final video output. In other words, the slices in the resulting single interleaved video stream 420 corresponding to video 402 are unmodified and are interleaved with modified video slices corresponding to other video streams.

In contrast, because each slice of the video stream 414 corresponding to video 404 needs to be repositioned such that the video's left edge is at the middle of the display, the slices 2.1, 2.2, 2.3, 2.4, 2.5, and 2.6 of the video stream 414 are modified such that the video stream contains data indicating such destination position of the slices. In one embodiment, the modified slices 2.1'–2.6' include patched coordinate 422 representing the new destination location of the slices. Thus, slices 2.1–2.6 are modified and become slices 2.1'–2.6' where slices 2.1'–2.6' differ from slices 2.1–2.6 only in their vertical, i.e., column, positions, as given by the slice start code value.

It is noted that although the interactive decoder only modifies the horizontal position of each slice of the one video stream that is repositioned in the example shown and described herein, the interactive decoder may need to modify both the horizontal and vertical positions or only the vertical position of the one or more video stream that are to be repositioned.

The unmodified slices 1.1–1.6 of the video stream 412 and the modified slices 2.1'–2.6' of the video stream 414 are then interleaved to result in a single interleaved video stream 420 representing a larger composite video comprising both videos 412, 414 for simultaneous display.

FIG. 5D schematically illustrates a composite video 424 which would be displayed on the user's display, such as a television set. The composite video 424 represents the resulting single interleaved video stream 420. In other words, the composite video 424 can be generated from the single interleaved video stream 420.

Preferred Embodiment: Modifying the MPEG-2 MBAI VLC

Figure 6:
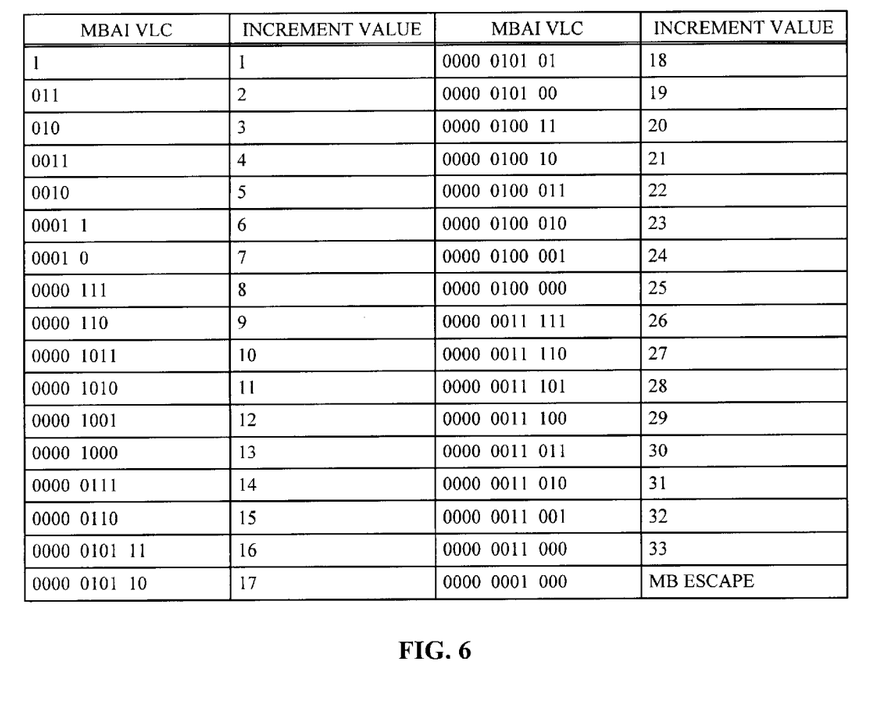
FIG. 6 is a table listing the MPEG-1 and MPEG-2 MBAI VLC (macroblock address increment variable length codeword) and the corresponding increment values.

FIG. 6 is a table listing the MPEG-1 and MPEG-2 MBAI VLC (macroblock address increment variable length codeword) and the corresponding increment values. As noted above, the MBAI VLC has length of 1 to 11 bits and indicates the horizontal positioning of the slice. As shown in FIG. 6, the number of bits for increment values of 1, 2–3, 4–5, 6–7, 8–9, 10–15, 16–21, and 22–33 are 1, 3, 4, 5, 7, 8, 10, and 11, respectively.

It is noted that a slice can be easily modified to have an MBAI VLC value having the same number of bits by simply modifying the bits to a different value. For example, a slice having an MBAI VLC value corresponding to an increment value of 2 can be easily modified to have an MBAI VLC value corresponding to an increment value of 3, or vice versa. Similarly, a slice having an MBAI VLC value corresponding to an increment value in the range of 10–15, the range of 16–21, or the range of 22–33 can be easily modified to have another MBAI VLC value corresponding to an increment value in the same range.

In addition, a slice can also be easily modified to have an MBAI VLC value having the same number of bits modulo 8. By modifying the MBAI VLC to another MBAI VLC having the same number of bits modulo 8, the resulting MBAI VLC will have the same bit position within a byte as the original MBAI VLC, i.e., the bit alignment within a byte would be unchanged. In other words, by having the MBAI VLC maintain the same bit alignment within a byte obviates the need to rotate all bits in the slice following the MBAI VLC bits, such as in a shift register. Avoiding such shifting or rotation of the remaining bits in the slice avoids a relatively expensive process.

In particular, the number bits modulo 8 for increment values of 2–3 and the number bits modulo 8 for increment values of 16–21 are both equal to 3. Thus, if an encoder encoded a slice having an MBAI VLC value corresponding to an increment value of 2 or 3, the MBAI VLC of the slice can be easily modified to a value corresponding to an increment value of between 22 and 33, or vice versa.

The modification of an MBAI VLC value of 011 corresponding to an increment value of 2 to the MBAI VLC value of 0000 0100 001 corresponding to an increment value of 24 will be presented as an example. In particular, a byte having value 0000 0100 is added to the original MBAI VLC and the 3 bits (011) of the original MBAI VLC are modified to a value of 001 such that the resulting MBAI VLC has the desired or destination value of 0000 0100 001. As is evident, the reverse conversion process can also be easily implemented by removing a byte from the MBAI VLC and modifying the remaining 3 bits to the desired value. Generally, only the first MBAI of the slices in a given row needs to be modified.

Thus, all slices that begin at the left edge of the display are preferably encoded with a MBAI VLC value corresponding to increment values of 2 or 3 by the broadcast center, for example, such that the slices can be easily modified to be repositioned to a display position corresponding to an increment value of between 22 and 33. In such an implementation, if the slices of a video stream are to be repositioned, the MBAI value is preferably modified from an increment value of 2 or 3 to an increment value of between 22 and 33, inclusive.

Although the modification between an increment value in the range of 2 to 3 and an increment value in the range of 22 to 33 is preferred and presented above, the above-described modification of the MBAI VLC can be applied to any other modification which results in a modified MBAI VLC having the same number of bits modulo 8. For example, a slice having an MBAI VLC value of 0000 0101 11 corresponding to an increment value of 16 can be modified to a slice having an MBAI VLC value of 0000 0001 000 0000 111 corresponding to an increment value of 41. The MBAI VLC value of 0001 000 0000 111 corresponding to an increment value of 41 is obtained by appending the 0000 111 bits corresponding to an increment value of 8 to the MB escape value of 0000 0001 000. The original MBAI VLC has 10 bits and the modified MBAI VLC has 18 bits. Thus, the original MBAI VLC and the modified MBAI VLC have the same number of bits modulo 8, i.e., 2.

With respect to the MBAI escape value, it is noted that the largest MBAI VLC has 11 bits and the MBAI escape value can be repeated as necessary to add 33 to the increment. Thus, if the MBAI escape value is repeated twice, followed by 0000 1001, the resulting increment is 78.

The above-described modification of the MBAI VLC value in all the slices of a video stream results in the repositioning of all the slices of the video stream.

Flow Chart Illustrating the Process of an MPEG-2 Interactive Decoder 140

Figure 7:
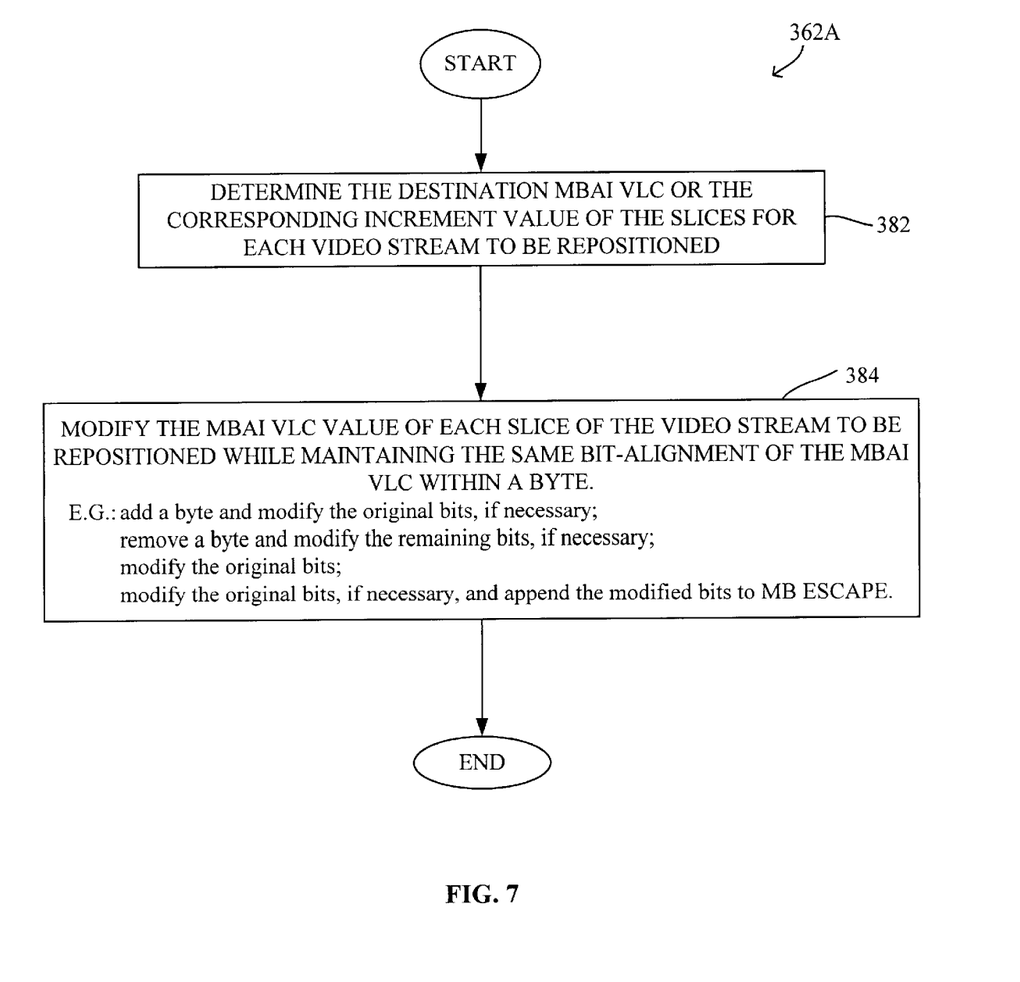
FIG. 7 is a flow diagram illustrating the process of an MPEG-2 interactive decoder of the present invention in processing a plurality of video streams for simultaneous transmission and rendering.

FIG. 7 is a flow diagram illustrating an exemplary process of an MPEG-2 interactive decoder of the present invention in processing a plurality of video streams encoded in MPEG-2 for simultaneous transmission and rendering. In step 382, the MPEG-2 interactive decoder determines the destination MBAI VLC or the corresponding increment value of the slices for each video stream to be repositioned. In step 384, the MPEG-2 interactive decoder modifies the MBAI VLC value of each slice of the video stream that is to be repositioned while maintaining the same bit-alignment of the MBAI VLC within a byte. Examples of the modification of the MBAI VLC value performed by the MPEG-2 interactive decoder include: (1) adding a byte and modifying the original bits, if necessary; (2) removing a byte and modifying the remaining bits, if necessary; (3) modifying the original bits; (4) modifying the original bits, if necessary, and appending the modified bits to MB escape.

Alternative Embodiment: Modifying the MPEG-1 MBAI

The system and method of the present invention may also be utilized in the context of MPEG-1 compression. In addition to the MBAI code, MPEG-1 compression provides an addition MBAI_stuffing code. The MBAI_stuffing code has 11 bits, a prime number. Thus, the MBAI code can be bit-aligned to any bit position within a byte by adding a selective number of the MBAI_stuffing code. It is noted that in the case of MPEG-1 encoded video streams, an additional requirement is that all slices start and end on the same row.

Figure 8:
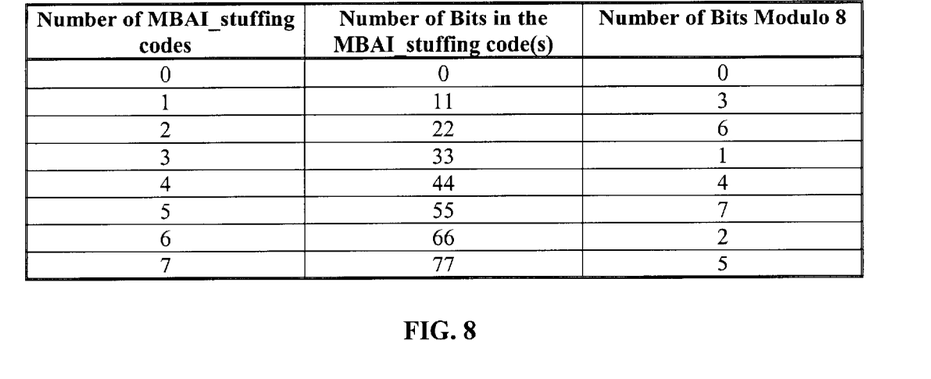
FIG. 8 is a table listing the number of MPEG-1 MBAI_ stuffing codes, the corresponding number of bits, and the corresponding number of bits modulo 8.

FIG. 8 is a table listing the number of MPEG-1 MBAI_stuffing codes, the corresponding number of bits, and the corresponding number of bits modulo 8. As shown, adding 0, 1, 2, 3, 4, 5, 6, or 7 MBAI_stuffing codes results in a bit-alignment shift of 0, 3, 6, 1, 4, 7, 2, or 5 bits. Thus, the MBAI code can be bit-aligned to any bit position within a byte by adding between 0 and 7 MBAI_stuffing codes.

Figure 9:
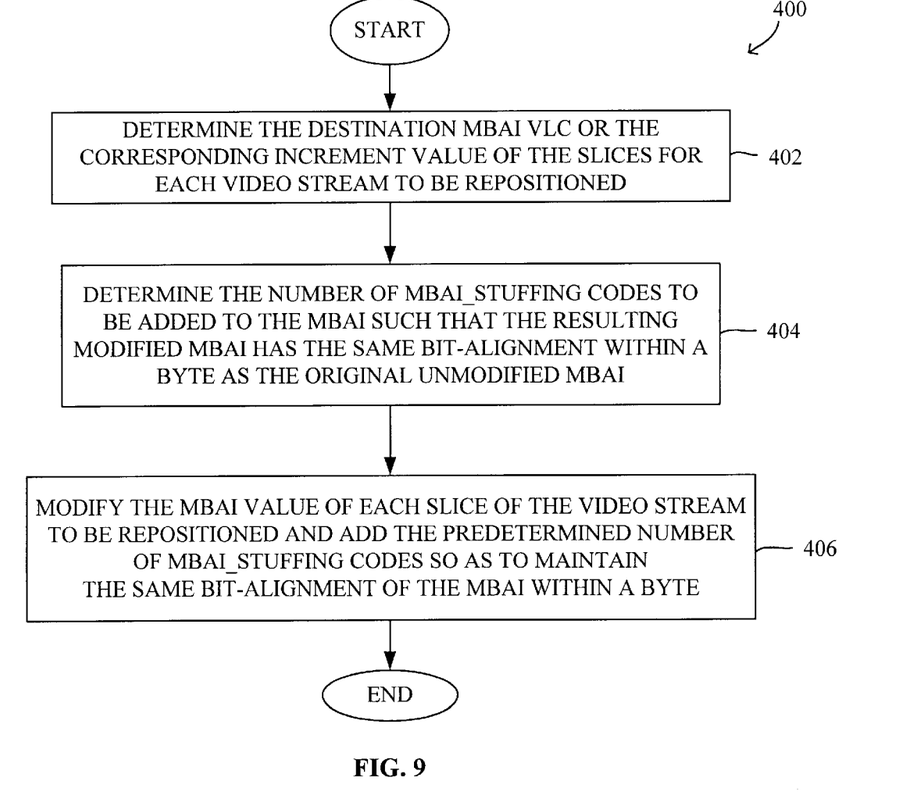
FIG. 9 is flow diagram illustrating the process of an MPEG-1 interactive decoder of the present invention in processing a plurality of video streams for simultaneous transmission and rendering.

FIG. 9 is flow diagram illustrating a process 400 of an MPEG-1 interactive decoder of the present invention in processing a plurality of video streams for simultaneous transmission and rendering. At step 402, the interactive decoder determines the destination MBAI VLC and/or the corresponding increment value of the slices for each video stream to be repositioned. At step 404, the interactive decoder determines the number of MBAI_stuffing codes to be added to the MBAI such that, after the MBAI is modified, the resulting code is bit-aligned to the desired bit position within a byte. At step 406, the interactive decoder modifies the MBAI value of each slice of the video stream to be repositioned such that the video slice would be repositioned at the desired location. In addition, the interactive decoder inserts the predetermined number of MBAI_stuffing codes into the slice so as to maintain the same bit-alignment of the MBAI within a byte.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims. For example, an application for the system and method described herein is a personalized EPG (electronic program guide) mosaic where a plurality of the end user's favorite shows is displayed, based upon a personalized list, for example. The end user may optionally select a subset of displays from personalized EPG mosaic and/or their respective display positions.

What is claimed is:

1. A method for simultaneous rendering of multiple encoded video streams, comprising:

receiving the multiple encoded video streams;
modifying at least one of the received multiple encoded video streams for repositioning the at least one of the multiple encoded video stream for display, at least one of said multiple encoded video streams being broadcast from a broadcast center, said modifying generates at least one modified encoded video stream;
selecting at least one video stream from said at least one modified encoded video stream and multiple encoded video streams;
interleaving said selected video streams into a single composite interleaved video stream;
and
outputting said single composite video stream.

2. The method for simultaneous rendering of multiple encoded video streams of claim 1, further comprising resizing the single composite interleaved video stream prior to said outputting.

3. The method for simultaneous rendering of multiple encoded video streams of claim 1, further comprising receiving the multiple encoded video streams from a broadcast center.

4. The method for simultaneous rendering of multiple encoded video streams of claim 1, further comprising receiving a list of encoded video streams available for simultaneous rendering.

5. The method for simultaneous rendering of multiple encoded video streams of claim 4, wherein said receiving the list of encoded video streams available for simultaneous rendering is via channel signaling.

6. The method for simultaneous rendering of multiple encoded video streams of claim 4, further comprising receiving user input from a user, said user input includes selection of the multiple encoded video streams selected from said list of encoded video streams available for simultaneous rendering.

7. The method for simultaneous rendering of multiple encoded video streams of claim 6, wherein said user input further includes a display location for each of at least one of the multiple encoded video streams.

8. The method for simultaneous rendering of multiple encoded video streams of claim 7, wherein said modifying utilizes each display location of the user input for the encoded video stream corresponding to said display location.

9. The method for simultaneous rendering of multiple encoded video streams of claim 1, wherein said modifying utilizes a default display location for each of at least one of the multiple encoded video streams.

10. The method for simultaneous rendering of multiple encoded video streams of claim 9, wherein said modifying determines each default display location by computing each default display location from layout rules.

11. The method for simultaneous rendering of multiple encoded video streams of claim 1, further comprising decoding said single composite interleaved video stream prior to said outputting.

12. The method for simultaneous rendering of multiple encoded video streams of claim 1, wherein said outputting includes outputting to a display for displaying said single composite interleaved video stream as a video display, the video display comprising a display of the modified multiple encoded video streams.

13. The method for simultaneous rendering of multiple encoded video streams of claim 1, wherein each of the multiple encoded video streams is encoded using a compression technology selected from the group consisting of MPEG-1 and MPEG-2.

14. The method for simultaneous rendering of multiple encoded video streams of claim 1, wherein said selecting is performed based upon stored preferences.

15. The method for simultaneous rendering of multiple encoded video streams of claim 1, wherein at least one of said multiple encoded video streams is stored in resident memory.

16. A system for simultaneous rendering of multiple encoded video streams, comprising:

an interactive decoder adapted to modify at least one of the multiple encoded video streams broadcast from a broadcast center for repositioning the at least one of the multiple encoded video stream for display and to generate modified multiple encoded video streams comprising the at least one modified encoded video stream and unmodified encoded video streams of the multiple encoded video streams, the interactive decoder further adapted to interleave the modified multiple encoded video streams comprising the at least one modified encoded video stream into a single composite interleaved video stream and to output said single composite video stream.

17. The system for simultaneous rendering of multiple encoded video streams of claim 16, wherein said interactive decoder is further adapted to receive the multiple encoded video streams from a broadcast center.

18. The system for simultaneous rendering of multiple encoded video streams of claim 16, wherein said interactive decoder is further adapted to receive a list of encoded video streams available for simultaneous rendering.

19. The system for simultaneous rendering of multiple encoded video streams of claim 18, further comprising a user interface in communication with said interactive decoder and adapted to receive user input from a user, said user input includes at least one of the multiple encoded video streams selected from said list of encoded video streams available for simultaneous rendering.

20. The system for simultaneous rendering of multiple encoded video streams of claim 19, wherein said user input further includes a display location for each of at least one of the multiple encoded video streams.

21. The system for simultaneous rendering of multiple encoded video streams of claim 20, wherein said interactive decoder is adapted to utilize each user input display location for the encoded video stream corresponding to said display location for modifying the corresponding encoded video stream for repositioning.

22. The system for simultaneous rendering of multiple encoded video streams of claim 16, wherein said interactive decoder is adapted to utilize a default display location for each of at least one of the multiple encoded video streams for repositioning.

23. The system for simultaneous rendering of multiple encoded video streams of claim 16, wherein said interactive decoder is adapted to decode said single composite interleaved video stream prior to outputting.

24. The system for simultaneous rendering of multiple encoded video streams of claim 16, further comprising a display in communication with said interactive decoder, wherein said interactive decoder is adapted to output to said display for displaying said single composite interleaved video stream as a video display, wherein the video display comprises a display of the modified multiple encoded video streams.

25. The system for simultaneous rendering of multiple encoded video streams of claim 16, further comprising a display for displaying said single composite interleaved video stream as a video display, wherein the video display comprises a video of each of the modified multiple encoded video streams including a repositioned video of each of the at least one modified encoded video stream.

26. The system for simultaneous rendering of multiple encoded video streams of claim 16, wherein each of the multiple encoded video streams is encoded using a compression technology selected from the group consisting of MPEG-1 and MPEG-2.

27. The system for simultaneous rendering of multiple encoded video streams of claim 18, further comprising a broadcast center for broadcasting the multiple encoded video streams to said inter active decoder.

28. An interactive decoder for simultaneous rendering of multiple encoded video streams, comprising:

means for modifying at least one of the multiple encoded video streams broadcast from a broadcast center for repositioning the at least one of the multiple encoded video stream for display, said modifying means generates modified multiple encoded video streams comprising the at least one modified encoded video stream and unmodified encoded video streams of the multiple encoded video streams;

means for interleaving the modified multiple encoded video streams into a single composite interleaved video stream; and means for outputting said single composite video stream.

29. The interactive decoder for simultaneous rendering of multiple encoded video streams of claim 28, further comprising means for receiving the multiple encoded video streams from a broadcast center.

30. The interactive decoder for simultaneous rendering of multiple encoded video streams of claim 28, further comprising means for receiving a list of encoded video streams available for simultaneous rendering.

31. The interactive decoder for simultaneous rendering of multiple encoded video streams of claim 30, further comprising means for receiving user input from a user interface, said user input including selection of the multiple encoded video streams selected from said list of encoded video streams available for simultaneous rendering.

32. The interactive decoder for simultaneous rendering of multiple encoded video streams of claim 31, wherein said user input includes a display location for each of at least one of the multiple encoded video streams.

33. The interactive decoder for simultaneous rendering of multiple encoded video streams of claim 32, wherein said modifying means is adapted to utilize each display location of the user input to modify the encoded video stream corresponding to said display location.

34. The interactive decoder for simultaneous rendering of multiple encoded video streams of claim 28, wherein said modifying means is adapted to utilize a default display location for each of at least one of the multiple encoded video streams.

35. The interactive decoder for simultaneous rendering of multiple encoded video streams of claim 28, further comprising means for decoding said single composite interleaved video stream.

36. The interactive decoder for simultaneous rendering of multiple encoded video streams of claim 28, wherein said outputting means is adapted to output to a display for displaying said single composite interleaved video stream as a video display.

37. The interactive decoder for simultaneous rendering of multiple encoded video streams of claim 28, further comprising means for displaying said single composite interleaved video stream as a video display.

* * * * *

UNITED STATES PATENT AND TRADEMARK OFFICE
CERTIFICATE OF CORRECTION

PATENT NO. : 6,539,545 B1  
DATED : March 25, 2003  
INVENTOR(S) : Vincent Dureau and Rama Murty Kalluri It is certified that error appears in the above-identified patent and that said Letters Patent is hereby corrected as shown below:

Column 19,  
Line 11, please delete "the".  
Lines 11, 13, 14 and 19, please add -- received -- before "multiple".  
Line 59, please delete "display" and replace with -- delay --.

Column 20,  
Line 9, please delete "18" and replace with -- 16 --.  
Line 11, please delete "inter active" and replace with -- interactive --.  
Line 14, please delete "the".  
Line 14, please add -- received -- before "multiple".  
Line 16, please add -- received -- before "encoded".  
Lines 17 and 18, please replace "generates" with -- generate --.  
Line 19, please add -- received -- before "encoded".  
Line 22, please add -- received -- before "multiple".

Signed and Sealed this

Twenty-fifth Day of November, 2003

JAMES E. ROGAN  
*Director of the United States Patent and Trademark Office*